US007224685B2

(12) United States Patent
Proctor, Jr.

(10) Patent No.: US 7,224,685 B2
(45) Date of Patent: May 29, 2007

(54) METHOD OF DETECTION OF SIGNALS USING AN ADAPTIVE ANTENNA IN A PEER-TO-PEER NETWORK

(75) Inventor: James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 1283 days.

(21) Appl. No.: 09/952,198

(22) Filed: Sep. 13, 2001

(65) Prior Publication Data

US 2003/0048770 A1    Mar. 13, 2003

(51) Int. Cl.
*H04L 12/56* (2006.01)
(52) U.S. Cl. ..................................... 370/349
(58) Field of Classification Search ............... 370/338, 370/349
See application file for complete search history.

(56) References Cited

U.S. PATENT DOCUMENTS

| | | | |
|---|---|---|---|
| 4,021,813 A | 5/1977 | Black et al. | ............... 343/768 |
| 5,027,125 A | 6/1991 | Tang | ........................ 342/368 |
| 5,293,172 A | 3/1994 | Lamberty et al. | ........... 343/701 |

(Continued)

FOREIGN PATENT DOCUMENTS

EP    1 130 837 A2    9/2001

OTHER PUBLICATIONS

Horneffer, Martin et al., "Directed Antennas in the Mobile Broadband System," *IEEE INFOCOM* 24-48:704-712 (1996).

(Continued)

*Primary Examiner*—Derrick W. Ferris
(74) *Attorney, Agent, or Firm*—Volpe and Koenig, P.C.

(57) ABSTRACT

An adaptive antenna signal identification process to provide increased interference rejection in a wireless data network such as a wireless Local Area Network (LAN). The adaptive antenna is located at an access point and can be steered to various angle of arrival orientations with respect to received signals. Associated radio receiving equipment utilizes two distinct signal detection modes. In a first mode, the directional antenna array is set to have an omni-directional gain pattern. In this mode, certain identification parameters of an initial portion of a received signal are detected, such as a source identifier. If the received signal has not been previously detected, then the antenna array is scanned determine a direction setting that provides a best received signal metric. Once the best directional setting for the received signal, that setting is saved for future use in receiving the same signal. If the received signal has been previously detected, the system instead will steer the directional antenna to the last known best direction for reception for the particular detected signal. As further portions of the same signal are received, such as payload portions of a data frame, the directional antenna array can continue to scan potential new best angles. When the invention is deployed in a relay function, where messages received from a first node are to be forwarded to a second node, the recorded direction of its best reception is retrieved for the second node and used when the antenna array is used to transmit the signal to the second node. Storage of the best antenna angle for propagation to neighbor nodes can be handled by control functions in a manner that is analogous to other router lookup tables, such as being contained in a lookup table that stores IP addresses.

31 Claims, 8 Drawing Sheets

U.S. PATENT DOCUMENTS

| | | | |
|---|---|---|---|
| 5,767,807 A | 6/1998 | Pritchett | |
| 5,905,473 A | 5/1999 | Taenzer | 343/834 |
| 5,963,559 A * | 10/1999 | Ohki | 370/445 |
| 6,100,843 A | 8/2000 | Proctor, Jr. et al. | 342/368 |
| 6,239,756 B1 | 5/2001 | Proctor, Jr. et al. | 343/702 |
| 6,239,757 B1 | 5/2001 | Ishikawa et al. | 343/711 |
| 6,304,215 B1 | 10/2001 | Proctor, Jr. et al. | 342/372 |
| 6,611,231 B2 * | 8/2003 | Crilly et al. | 342/378 |
| 2002/0097700 A1 * | 7/2002 | Alastalo et al. | 370/338 |

OTHER PUBLICATIONS

Kalis, Antonis et al., "Relative Direction Determination in Mobile Computing Networks," *IEEE Instrumentation and Measurement Techn. Conf., Budapest* pp. 1479-1484 (2001).

Ko, Young-Bae et al., "Medium Access Control Protocols Using Directional Antennas in Ad Hoc Networks," *IEEE INFOCOM*, pp. 13-21 (2000).

Nasipuri, A. et al., "A MAC Protocol for Mobile Ad Hoc Networks Using Directional Antennas," *IEEE*, pp. 1214-1219 (2000).

* cited by examiner

METHOD OF DETECTION OF SIGNALS USING AN ADAPTIVE ANTENNA IN A PEER-TO-PEER NETWORK

BACKGROUND OF THE INVENTION

This invention relates generally to wireless data transmission systems and in particular to a technique for using directional antennas in such systems.

In corporate enterprises, wireless Local Area Networks (LANs) are usually implemented as a final link between existing wired networks and a group of client computers. Today's business environment is characterized by an increasingly mobile work force, who spend much of their time working in teams that cross functional, organizational and geographic boundaries. Often their most productive times occur in meetings that take place away from their desks. Users of portable computing equipment therefore need access to their data files through networks that reach far beyond their personal desktops. Wireless LANs fit well into this environment, providing much needed freedom in network access to mobile workers. Such networks provide access to information from anywhere within an enterprise, such as from a conference room, cafeteria, or even a remote branch office. Wireless LAN connectivity affords access to the full resources and services of a corporate network across a building or campus setting. As such, they are on the verge of becoming a mainstream solution for a broad range of business applications.

One critical issue affecting the effectiveness of wireless LAN deployment has been the historically limited throughput available with such equipment. The 2 Mega bits per second (Mbps) data rate specified by the original Institute of Electrical and Electronics Engineers (IEEE) wireless LAN standard 802.11, dated 1997, is now considered to be too slow to support most business requirements. Recognizing the need to support additional higher data rate transmissions, the IEEE recently ratified an 802.11b standard that specifies data transmission speeds of up to 11 Mbps. With the 802.11b standard, wireless LANs are expected to be able to achieve throughput comparable to the legacy wired Ethernet infrastructure. Emerging wireless networking systems that promise to provide comparable data speeds include Home RF, BlueTooth, and third generation digital cellular telephone systems.

In these peer-to-peer networks, the individual computer nodes operate in a same frequency communication network. That is, these systems utilize signal modulation schemes such as Code Division Multiple Access (CDMA) wherein a number of end nodes are actually transmitting on a same radio frequency carrier at the same time. Such systems may experience significant quality degradation due to the interference of equipment that is not participating in system communication processes. For example, wireless LAN systems typically operate in unlicensed radio frequency bands. Other types of radio equipment operate in these bands, equipment that is not required to operate in accordance with the promulgated LAN standards, and therefore, cannot be controlled. These transmissions from such non-system nodes can significantly reduce the performance of a wireless LAN. As data rates increase, susceptibility to such interference also increases accordingly.

Various other problems are inherent in wireless communication systems. One such problem is the so-called multipath fading problem whereby a radio frequency signal transmitted from a sender (either a base station or another mobile subscriber unit) may encounter interference enroute to an intended receiver. The signal may, for example, be reflected from objects such as buildings that are not in a direct path of transmission but then are redirected as a reflected version of the original signal to the receiver. In such instances, the receiver actually receives two versions of the same radio signal: the original version and a reflected version. Since each received signal is at the same frequency but out of phase with one the other due the longer transmission path for the reflected signal, the original and reflected signals may tend to cancel each other out. This results in dropouts or fading of the received signal.

Radio units that employ single element antennas are highly susceptible to such multipath fading. A single element antenna has no way of determining a direction from which a transmitted signal is sent and cannot be tuned or attenuated to more accurately detect or receive a signal in any particular direction operating by itself. It is known that directional antennas can therefore alleviate both the multipath fading and similar problems to some extent.

SUMMARY OF THE INVENTION

The present invention is used in a wireless data network that employs an adaptive directional antenna array to assist in isolating physical layer radio signals transmitted between system nodes. A controller can configure the antenna apparatus to maximize the affect of radiated and/or received energy. Specifically, the antenna apparatus typically includes multiple antenna elements and a like number of adjustable devices such as phase shifters, passive elements, or the like, that may be independently changed to effect the phase of received and/or transmitted signals. The antenna apparatus can therefore be oriented or steered to various angle of arrival orientations with respect to transmitted or received signals.

The adaptive antenna makes use of radio receiving equipment that utilizes two distinct signal detection modes. In a first receive mode, the controller sets the antenna to an omni-directional setting. This mode is used when a received signal has not yet been identified or the link layer connection established. A second receiver mode, in which the antenna is set to a specific directional angle, is used after a receive signal has been identified or a link layer connection established.

According to an embodiment of the invention that uses identification of the received signal to determine the antenna array mode, a multi-step process is employed.

In a first step of the process, the directional antenna array may be controlled such that it has an omni-directional gain pattern. In this mode, when an incoming transmission is first received, certain identification parameters of an initial portion of the signal are detected. For example, these may be a source identifier encoded in a preamble portion of a Media Access Control (MAC) layer portion of a wireless Local Area Network (LAN) signal.

If the received signal has been previously detected, the controller will steer the directional antenna to a last known best direction for reception of further portions of the particular detected signal.

If the received signal has not been previously detected, then the controller scans the directional antenna to determine a direction setting that provides a best received signal metric. This can proceed, for example, as an angular search of possible antenna angle settings, and testing a received signal metric for each candidate direction. The received signal metric may, for example, be received signal strength, bit error rate, noise power, or other comparable measure. Once the best directional setting for the antenna is determined, that setting is saved for future use in receiving the identified signal.

As further portions of the same signal are received, such as payload portions of the data frame which follow a preamble portion, the directional antenna array can be operated to continue to scan potential new angles, continuing to look for the best signal metric in a directive mode all the time. Once a signal transmission is concluded, the last known best angle for that signal, along with an identification of the signal, for use in future reception of that same signal.

In a second embodiment, the invention also employs both the omni-directional and directional modes of the antenna, as in the previous embodiment. In a first step of this process, the antenna array is set to an omni-directional mode. A first portion of a received signal is then examined, to determine when a link layer establishment message, such as a Request to Send (RTS) message is received. After an RTS is detected, identification information for the sender of the RTS is used to determine a last known angle of arrival. The array is then steered to this direction for subsequent transmission of, for example, a Clear to Send (CTS) message. A follow-on step may be employed when an acknowledgement of the CTS is then listened for; if the CTS acknowledgement is received, then it is known that the antenna is steered to a proper direction. However, if an acknowledgement of the CTS is not received, it is assumed that the antenna angle must be re-established through scanning candidate angles.

The foregoing embodiment is particularly useful in an access node or other central base unit.

Yet another embodiment of the invention can use the array as follows. An initial link layer transmission, such as a Request to Send (RTS) may be sent to an intended receiver in a directional mode. This embodiment is particularly useful where a sender has stored information as to a likely direction for the intended receiver. The unit then waits to receive a Clear to Send (CTS) indication in a receive mode with the antenna set to the same angle.

If the CTS is received, then it is assumed that the direction is correct, and a link layer connection is established.

However, if the CTS is not received within a specified time, the controller resets the array to an omni-directional mode, and attempts again to establish the link layer connection.

When the invention is deployed in a peer-to-peer network, it may also be used in connection with a device that is responsible for relaying messages from a first node to a second node. This functionality is an analogous to a router function in a wireline Internet Protocol (IP) network. In such an application, during the detection process, the angle providing the best received signal metric was recorded during the receive mode for a number of nodes in the networks as described above. Therefore, whenever a message is received from a first node that needs to be relayed to a second node, if signals have already been received from that second node, then the recorded direction of its best reception is retrieved and used when the antenna array is used to transmit the signal to the second node. Storage of the best antenna angle for propagation to neighbor nodes can be handled by control functions in a manner that is analogous to other router lookup table functions, such as being contained in a lookup table entry associated with IP addresses.

Figure 1:
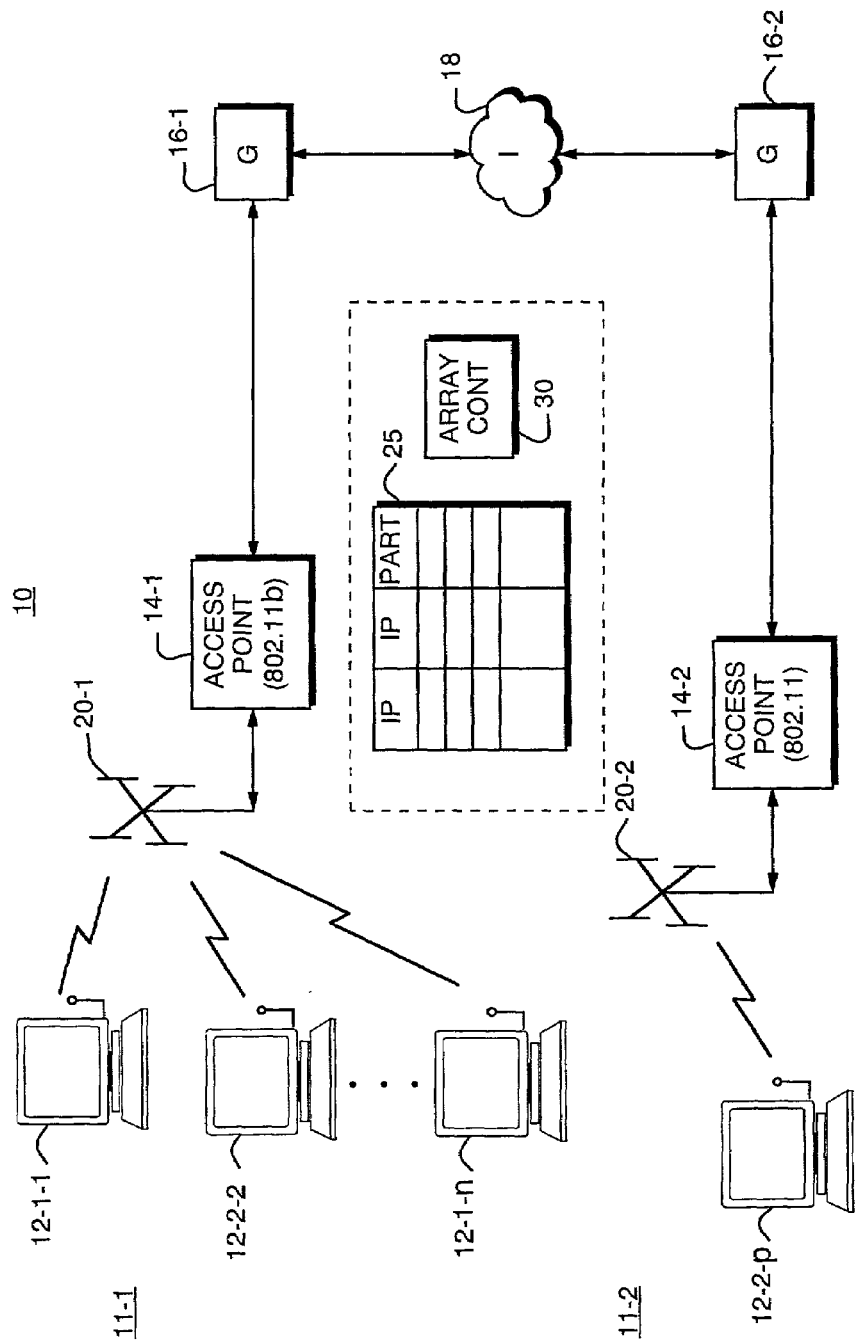
FIG. 1 is a block diagram of a system in which the invention is implemented.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

FIG. 1 is a high level block diagram of a wireless data communication network 10 in which the invention may be deployed, such as network for providing wireless connectivity between a number of end nodes 12 and a data network such as the Internet 18 through access point equipment 14.

Specifically, a first wireless Local Area Network (LAN) 11-1 formed by the nodes 12-1-1, 12-1-2, ... 12-1-n. These nodes 12-1 communicate with each other and a first access point 14-1 using specially formatted radio signals. A directional antenna array 20-1 is used with the access point 14-1 in the first wireless LAN 11-1. The access point 14-1 is responsible for converting received radio frequency signals to their appropriate wired format such as the TCP/IP format suitable for Internet communications through a gateway 16-1. The gateway 16-1 may be a router, switch, or other internetworking device.

A similar second wireless LAN 11-2 involves the nodes 12-2-p, antenna 20-2, access point 14-2, and gateway 16-2.

Each of the nodes 12 include a remote station which is typically a portable Personal Computer (PC) equipped with a wireless network interface card (NIC). Other types of computing equipment such as Personal Digital Assistants (PDAs), desktop computing equipment, and other networkable devices are possible.

The access point (AP) 14-1 acts as a sort of bridge between the wireless network 10 and wired networks such as the Internet 18. The access point 14-1 acts as a base station for the physical layer signaling used in the wireless network, aggregating access for multiple wireless nodes 12-1-1, ... 12-1-n onto the wired network. The access point 14 usually consists of radio receiver and transmitter equipment and a wired network interface such as an IEEE 802.11 Ethernet interface. If the access point 14 is to provide connectivity to other networks, it may typically include bridging software conforming to, for example, 802.1 Bridging Standard, and other software such as firewalls and the like. It therefore acts as a router or bridge, from the perspective of higher layer data networking protocols.

In addition to standard wireless LAN signaling equipment, the access point 14-1 also contains a table 25 which is capable of storing identification information for the nodes 12 such as a unit identification and an associated antenna setting parameters, such as an angle. An array controller 30 that permits steering of the particular direction of the antenna 20-1 such as by specifying an angle. Signal receiving equipment in the access point 14-1 also contains detection circuits that are capable of determining a received signal metric, such as Received Signal Strength Indication (RSSI), Bit Error Rate (BER), noise power level, or other such measures of receive signal quality.

Figure 2A:
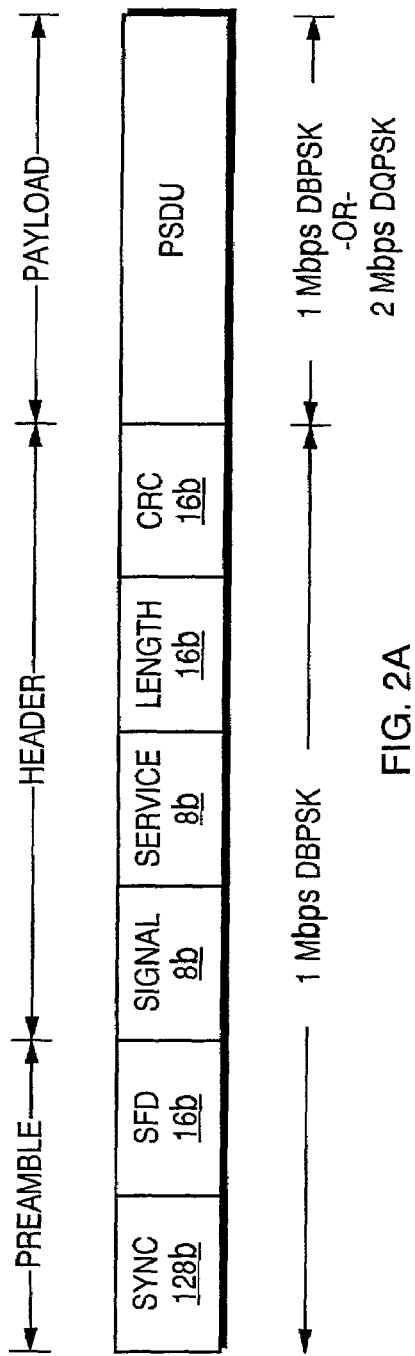
FIGS. 2A and 2B provide examples of Media Access Control (MAC) layer data frames or messages that may be used to format transmitted signals.
Figure 2B:
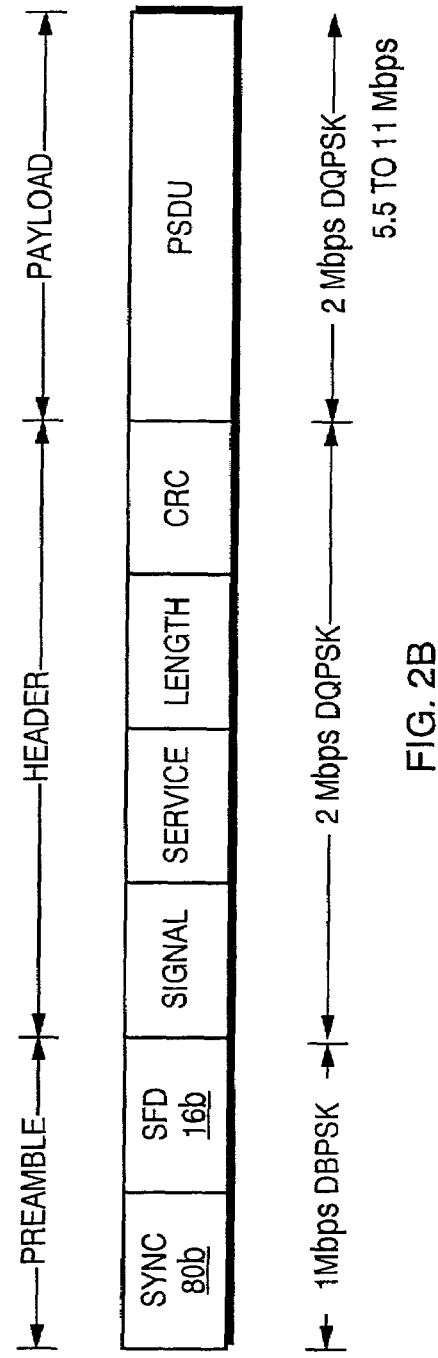

FIGS. 2A and 2B illustrate the format of a message or frame structure such as described in the wireless LAN specification IEEE 802.11b. The message consists of a Media Access Control (MAC) layer preamble, header, and payload portion or Protocol Specific Data Unit (PSDU). The messages in IEEE 802.11 may be either a long preamble-type as used in the connection with the message shown in FIG. 2A, as well as the short preamble-type as shown in FIG. 2B. The different frame formats are associated with supporting different data rates. The frame format shown in FIG. 2A uses either Double Binary Phase Shift Keying (DBPSK) or Double Quadrature Phase Shift Keying (DQPSK) encoded at, respectively, 1 Mbps or 2 Mbps to modulate the payload portion. The frame format in FIG. 2B utilizes DQPSK to realize data rates of 5.5 Mbps or 11 Mbps.

Note also that for both frame formats, the preamble and header portions of the frame utilize a more robust encoding scheme than the data payload portions. This permits more reliable detection of the header and preamble in the presence of noise.

The preamble of either formats shown in FIG. 2A or 2B include an indication of the particular senders, such as in the SFD portion.

Figure 3:
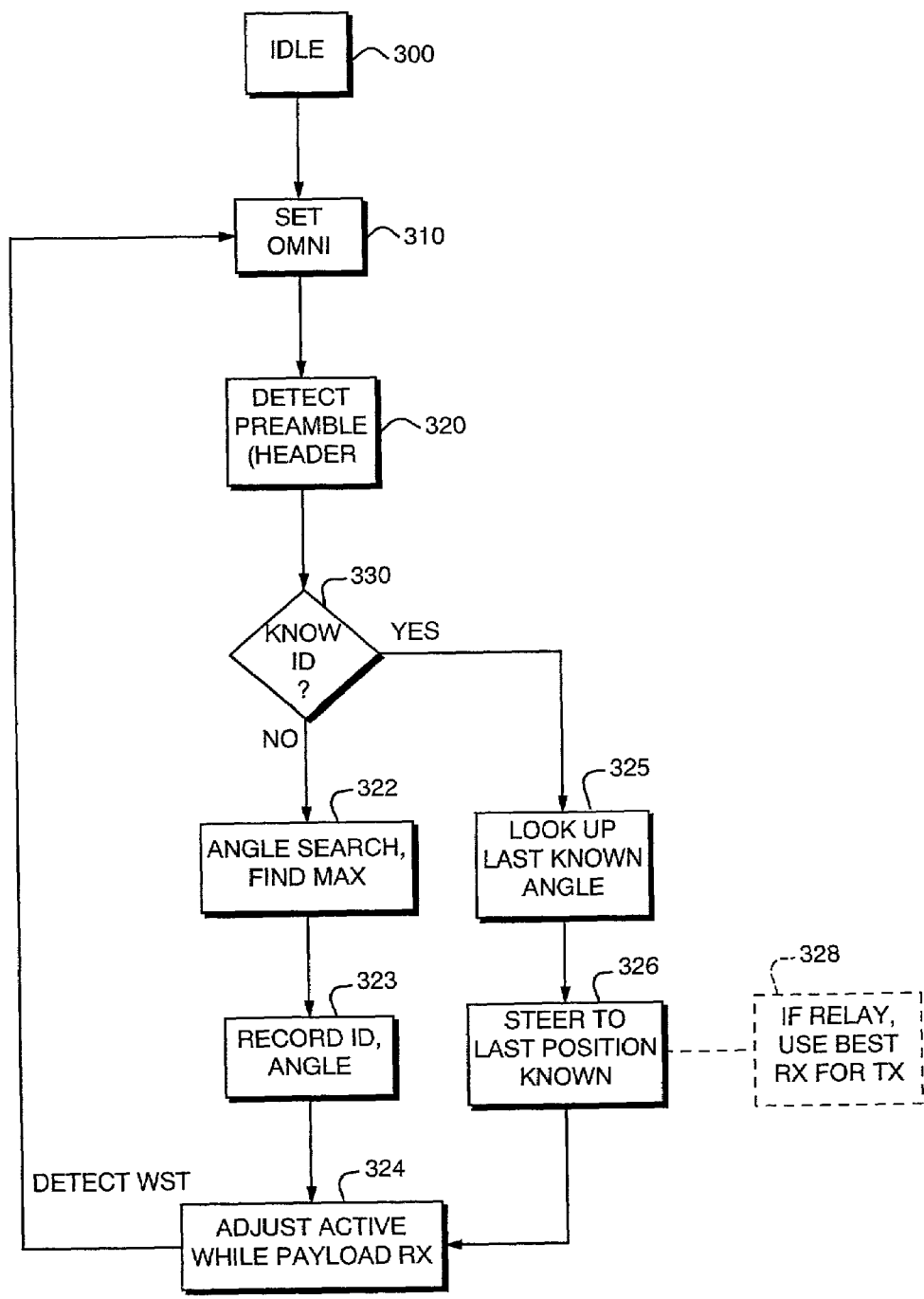
FIG. 3 is a sequence of steps performed by an antenna controller in order to process received signals according to a first embodiment.

FIG. 3 illustrates a flow chart of a process for receiving wireless network signals in accordance with the invention. The process is performed in an access point 14 as it receives signals from nodes 12, and may typically be carried out during physical layer processing.

From a first idle step 300, the antenna 20 associated with the respective access point 14 is initially set into an omni-directional mode. In this omni-directional mode, a state 320 is then entered in which the preamble portion and/or header of a received signal is detected. In state 330, the initial portion of the received signal is examined to identify it uniquely. If the received signal is unknown, e.g., the node 12 which originated the signal has not been seen before, the antenna is then set in an angle search mode in state 322. In this mode, the antenna 20 is therefore stepped through a sequence of directional angles to find a direction of maximum received signal strength, signal quality, lowest Bit Error Rate (BER) or other signal quality metric. In state 323, when this angle is determined, it is recorded and associated with the device identification information, such as a table entry 25 associated with that device. The table as shown in FIG. 1 may be kept by the access point 14 as part of its message routing table.

In any event, the access point 14 may then enter a state 324 in which during active receptions, the optimum angle is continuously adjusted while receiving the payload data portion of the frame. If reception of the frame is then lost or otherwise completed, then the last best known angle is recoded in the table, and processing returns to the initial state 310.

If from state 330 the signal was able to be identified, e.g., a signal has been previously received from the transmitting node 12, then processing proceeds to a state 325 in which the last known angle is looked up in the table 25. This last known angle is then used by the controller 30 to steer the array to the last known position. The array then remains in this last known position at least for reception of the payload portion of the signal in state 326. From there, the state 324 may continue to be entered as the payload portion is being received whereby the angle is continuously adjusted while it is active and any updates are then recorded in the table 25.

The state 328 may be entered from state 326 if the unit is in a relay mode, where the best received angle may be used a subsequent transmissions to that same node.

Figure 4:
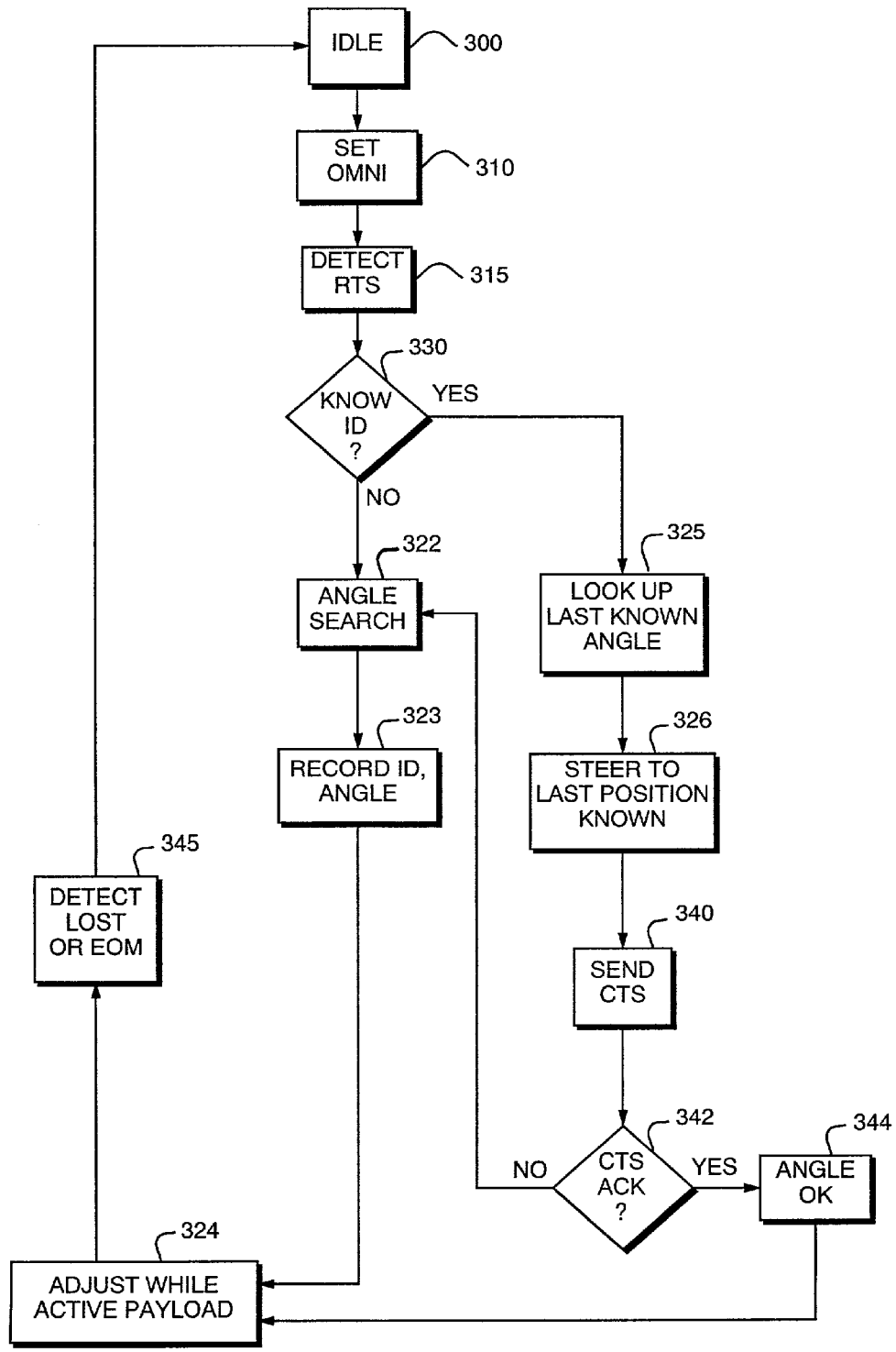
FIG. 4 is a process diagram for the antenna controller according to a second embodiment.

FIG. 4 is a diagram of a slightly modified process that may also be used according to the present invention. The number of steps of the process in FIG. 4 correspond, more or less, to the steps of FIG. 3. For example, from a first idle step 300, the antenna 20 is initially set in step 310 to an omni-directional mode. However, in this embodiment higher layer level signaling is examined. For example, in step 315, a Request to Send (RTS) message is detected such as at a link layer. In step 330, the message is again examined to see if the originator has a known identification. If so, steps 325 and 326 proceed as previously where the last known angle associated with that sender is determined in step 325 and the antenna 20 is steered to the last known angle in step 326. In this instance, the unit will then send a Clear to Send (CTS) message in step 340 with the antenna now set to the last known angle.

If however, back in step 330, if the identification of the detected RTS is not known, then an angle search proceeds in state 322 and the ID and angle of the best reception state is recorded in step 323. Step 324 continues as previously where the angle may be adjusted while active payload data is being received. Step 345 may be entered when the signal detection is lost and/or an end of message (EOM) is received.

Returning attention to an instance in which the last known angle is steered to in state 326, a Clear to Send (CTS) message is sent step 340. Next, a CTS acknowledgement is waited for in step 342. The acknowledgement would typically be received within a predetermined amount of time or otherwise a time-out condition exists. If the acknowledgement is received, then the specified angle is presumed to be okay and in state 344 and then processing may proceed to step 324. However, if a time-out does occur in step 342, then it is presumed that the angle to which the antenna 20 was steered is bad and therefore the angle search state 322 must be entered.

The foregoing methods are particularly useful in applying an application to an access node or central base station unit wherein it is intended to service a number of remote subscriber units.

Figure 5:
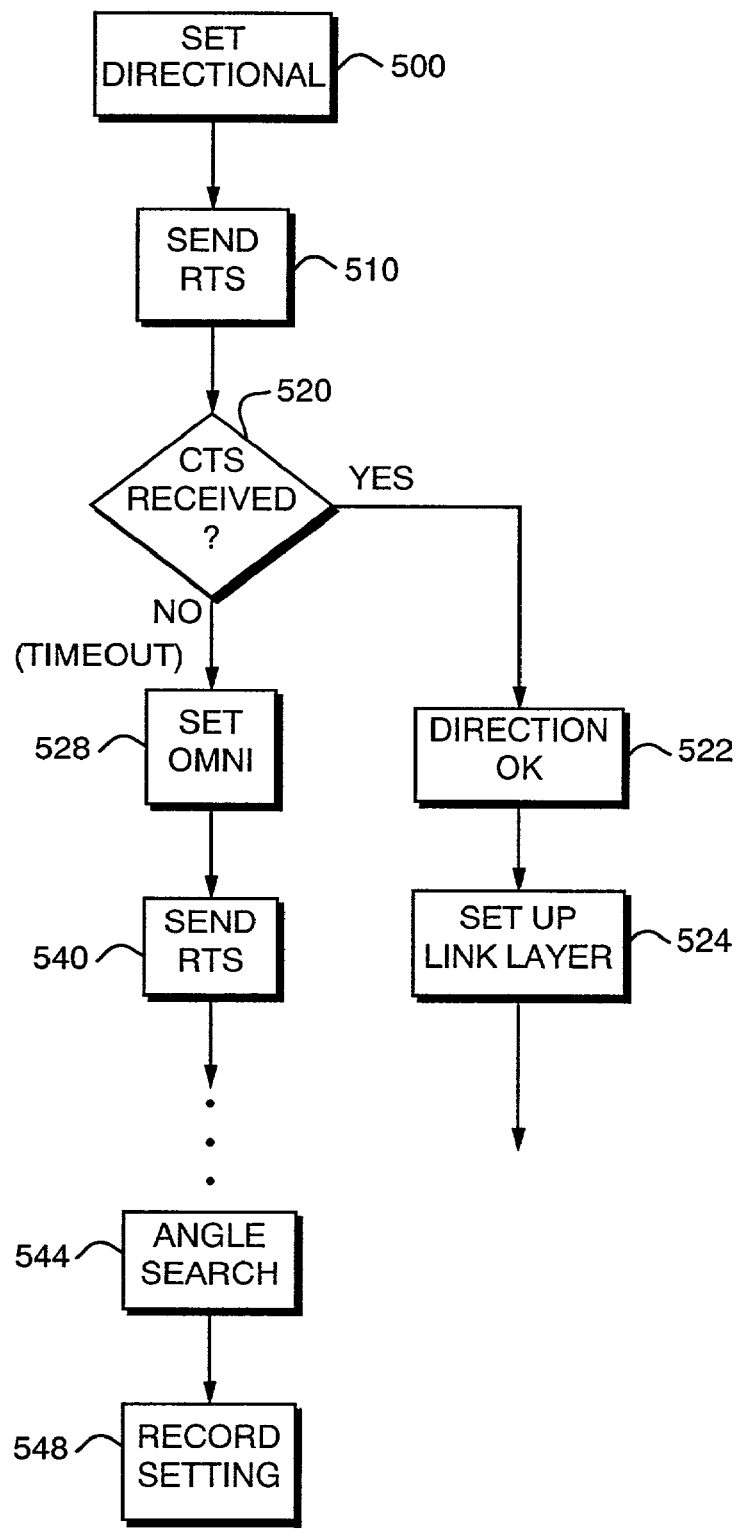
FIG. 5 is yet another process which the controller may perform.

However, another embodiment of the invention can be applied to advantage in a subscriber unit as follows. This set of operations is illustrated in FIG. 5. In a first step 500, the antenna is set to a directional mode. For example, it is typically common that the subscriber will have the given information with respect to its candidate direction in which the base station exists. In step 510, a Request to Send (RTS) message is sent in a directional mode. In step 520, if a Clear to Send (CTS) message is received back from the base station, then it can be presumed that the antenna direction setting is okay in step 522 and the link layer communications may proceed in step 524.

If however, in step 520 there is no CTS received within a time-out period, then it is presumed that the antenna is incorrectly set. Thus, an omni-directional mode is entered in step 528 and the RTS message is sent in step 540. Processing then proceeds from that point similar to that described in FIG. 3 and/or FIG. 4, i.e., an angle search is performed to properly set the antenna in step 544 and the setting is recorded in step 548.

FIG. 5 illustrates a sequence of higher level messages that may be sent in a typical network computer environment. Specifically, a source station which may either be the access point 14-1 or remote stations 12, sends a message 610. The message 610 may consist of one or more packets that have the previously described preamble, header, and payload portions. The message may be a relatively detailed message or may be a relatively simple message such as a request to set up a connection and send further information.

In response to receipt of the message 610, the destination station is expected to return and acknowledgement message 612. This acknowledgement message 612 may have a preamble portion and a header portion that specifically has a header or payload portion that is a known acknowledgement (ACK) format. The higher layer protocol may be, for example, implemented at a link layer.

The present invention may make use of these higher layer protocol units to invoke other protocols to help train the antenna.

The acknowledgement message 612 is sent upon receipt of a proper message 610 at the destination station. However, situations may also exit 614 in which no acknowledgement is sent from the destination. This is typically done if the message is not received within a predetermined period of time at the destination. In that manner, the source will know to attempt to retransmit the message 610. This acknowledgement protocol is typical of higher layer protocols in widespread usage in data communication networks typical of the Transmission Control Protocol/Internet Protocol (TCP/IP) protocol used in Internet data communications.

It may become necessary to use the higher layer protocol information in certain circumstances wherein the physical layer protocols do not permit time to demodulate the data frame and/or do not contain identification of the sending station in the preamble portion. Such protocols present a problem in that there is no way to know transmitter ends without some type of demodulation taking place. However, there is, in turn, no time in which to or there is no time in which to demodulate the signal. For example, it may not be possible to determine quality of a reception until after an entire frame is processed. This may depend upon the specific coding used for the frame. In addition, certain protocols may use preamble portions that are too short in duration to identify the best direction in time for this antenna array to be affectively steered to the appropriate direction. For example, 802.11B Standard is potentially acceptable in this regard. However, protocols such as the 802.11A Wireless LAN Standard may not provide sufficient duration preamble. In addition, the wireless LAN protocols work on a similar radio link protocol that is similar to Ethernet. In particular, a positive acknowledgement radio link protocol is used. For example, if correctly received packets are acknowledged whereas incorrectly received packets are not. Thus, the non-acknowledgement test can be performed at a radio link protocol layer and/or higher level layers.

Figure 6:
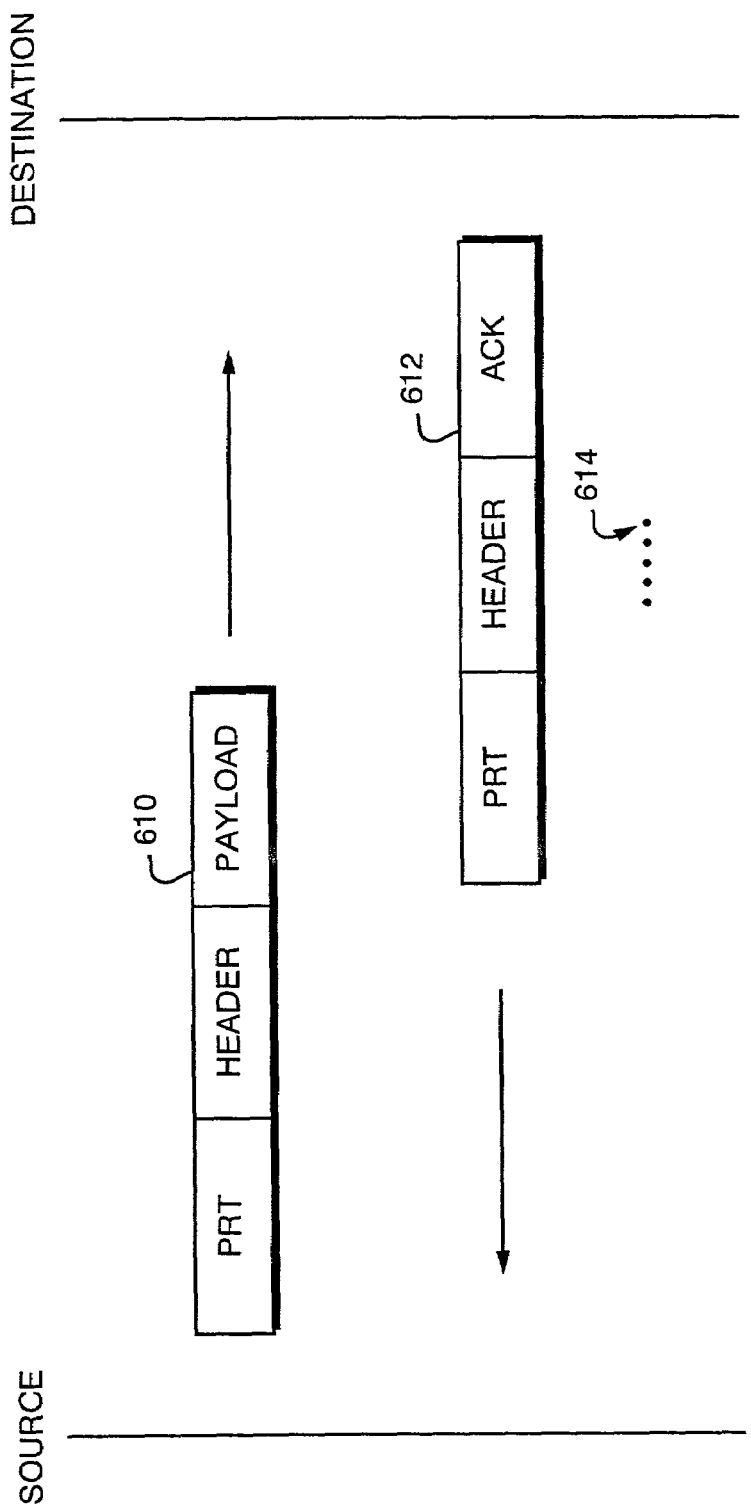
FIG. 6 illustrates a message and its acknowledgement.
Figure 7:
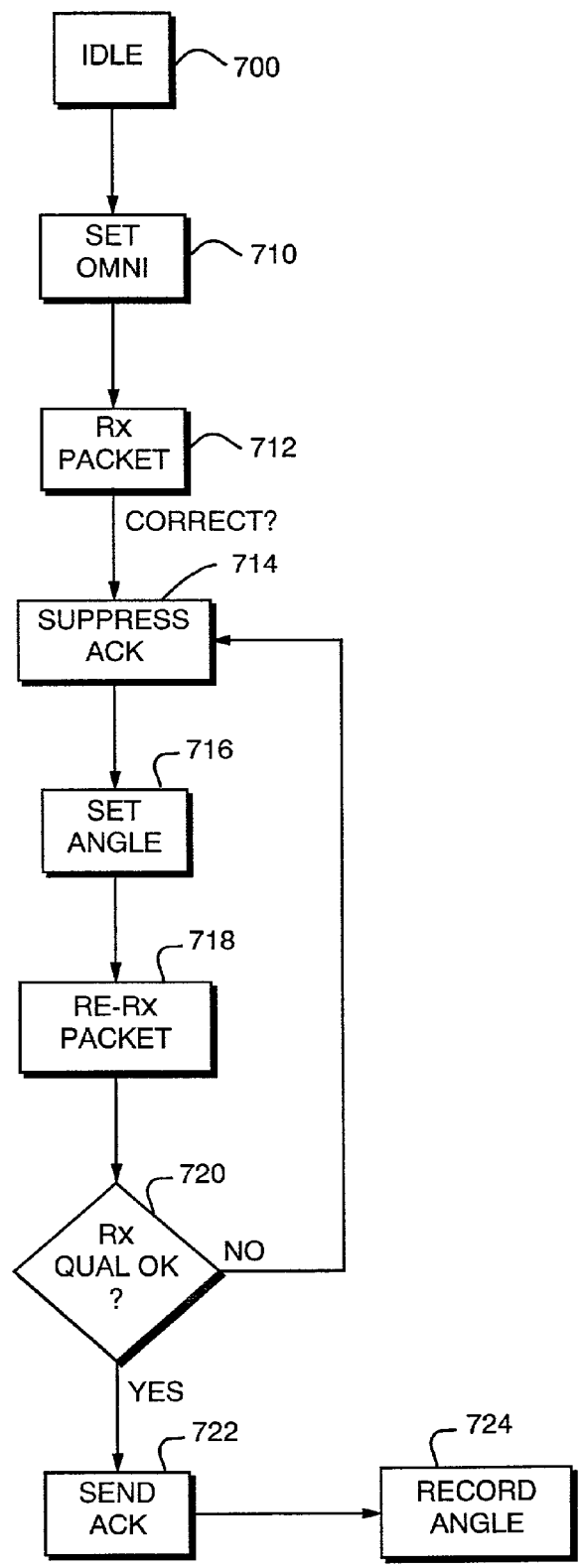
FIG. 7 is a sequence of steps using acknowledgement suppression to confirm antenna angle setting.

Essentially, the process is shown as in FIG. 6. For an initial idle state 600, tenant array 20 is first steered to an omni-directional state.

In a next state 712, a transmission is received. When this packet is received correctly, a state 714 is entered in which the acknowledgement 612 that would normally be sent is suppressed. Therefore, the unit enters a mode in which no acknowledgement is sent 614. This permits entry to a state 716 in which the angle for the antenna may be set. The suppression of the acknowledgement in state 714 causes a second receipt of the packet in state 718. In this second receipt in state 720, the received quality is compared. If the received quality is not adequate, then the process loops back to state 714 in which the acknowledgement is suppressed once again. Step 714 through 720 are continuously executed until an acceptable received packet quality is determined in state 720. When this occurs, control passes to state 722 in which an acknowledgement is presently sent. The set angle is then recorded with the identification of the unit for subsequent communication with that unit.

It should be understood that in certain instances upon receipt of the packet in 712, if the identification of the unit can be determined, then the angle may be more appropriately set upon the second try in state 716, such as in shown in FIG. 3. For example, if the identification of the remote unit can be made from the received packet in state 712, then the angle search associated with step 714 through 720 can proceed more expeditiously.

What is important to note here is that the higher layer protocol is being used to force a retransmission of a packet for the purpose of optimizing the antenna array setting. Other protocol attributes or units could be used for similar results. For example, a contention-free window can be set up by certain protocols using a so-called PCF or HCF mode. In the PCF mode, a means is provided for discovering the best angle that can be controlled by an access point as to which units will be transmitting during a certain period of time. Thus, the identification of the unit being known in advance, the antenna can be steered to the last known direction for the communication prior to its receipt. Thus, the control messages may be set up while an omni-directional mode then when transmitting to the remote unit, the directed mode can in HCF or Hybrid Coordination Function can be determined.

Figure 8:
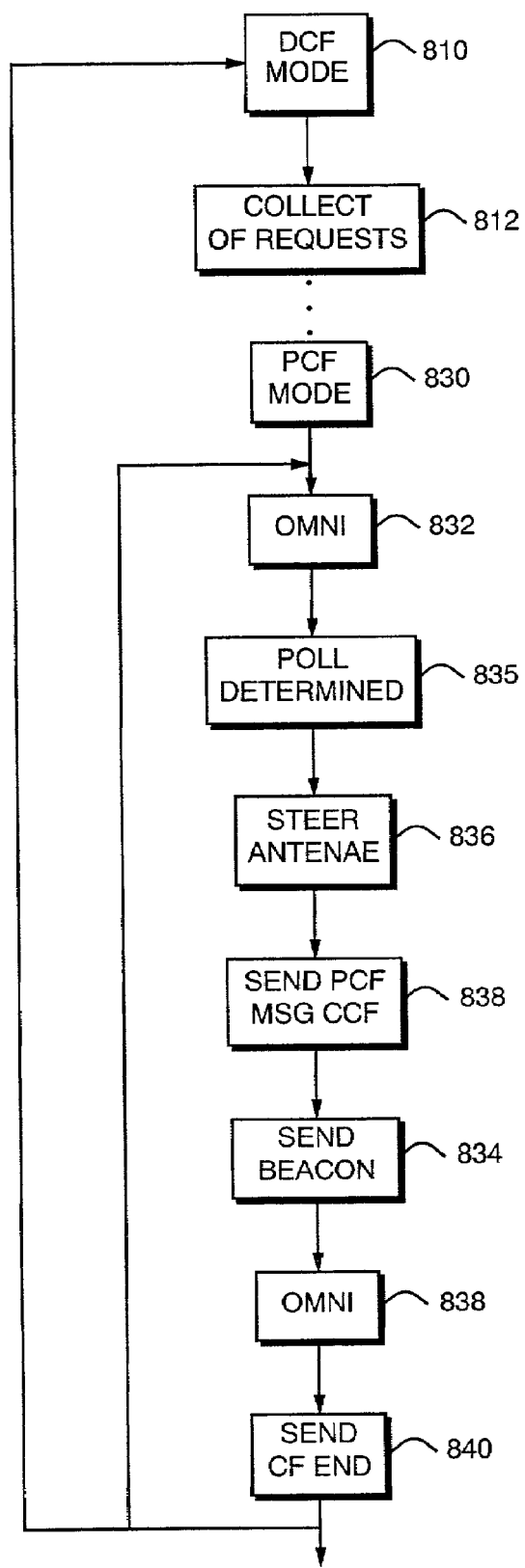
FIG. 8 is a sequence of steps using contention-free periods to confirm antenna angle setting.

Turning attention more particularly to FIG. 8, an 802.11 access point 12 has essentially two modes, including a distributed correlation function (DCF) mode 810 and a point coordination function (PCF) mode 830. In the DCF mode, communication is basically contention-based whereby any one of the subscriber units 12 may be allowed to attempt to send messages to the access point 14 at any point in time. The PCF mode 830 is entered into from time to time to provide a mode in which contention-free communication is possible. Thus, while in the PCF mode, the system guarantees to a particular subscriber unit 12 that it will be able to have exclusive access to the airwaves and send messages to the access point 814, free of any collision with other subscriber units 12.

Thus, in one state 812 associated with DCF mode 810, the access point 14 receives requests on a sporadic basis from particular subscriber units 12 to be granted contention-free areas (CF) at a later time. Eventually, the PCF mode is entered in state 830. In this state, the antenna is first sent to an omni-directional mode 832. In a next state 834, a beacon signal is sent to all subscriber units 12 to indicate that the PCF mode is being entered into. This is a signal to all units to listen for upcoming polling information to determine if they will be granted a contention-free period. A poll signal is then sent out at state 834. A response to the poll signal in state 834 determines a particular identifier of one of the subscriber units 12 which is to be granted contention-free access during the PCF mode. It should be understood that during any given PCF mode, a number of different subscriber units 12 may be granted exclusive use or may be granted a contention-free period one after the other.

From its schedule of subscriber units 12 that have requested contention-free periods, the access point in state 834 polls the first such unit on its list. The poll message is sent by steering the antenna to the last known location or correct angle for the particular identified subscriber unit 12. This particular PCF message is then sent in step 838 as a contention-free message. Steps 834 through 838 are then continuously executed until each of the subscriber units that had requested a CF eventually be granted their turn at a contention-free period. Upon each subsequent such subscriber unit 12 being accessed during the contention-free period, the antenna will be steered to its respective appropriate direction in the state 836 prior to sending the associated PCF message for the particular subscriber unit 12. At the end of the contention-free processing in state 838, the access unit may then steer the antenna array 20 back to an omni-directional mode so that in a state 840, a contention-free period end message may be sent to all of the subscriber units so that they may understand that the end of PCF mode has been reached and that the system is then now returning to a DCF mode in state 810.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for operating a communication network in which a first and second station exchange information using wireless physical layer signaling, comprising the steps of:
   setting an omni-directional mode for an antenna array;
   receiving a transmission at the first station from the second station;
   determining an identification of the second station from the received transmission;
   steering the directional antenna array in the direction of the last known location for the identified unit; and
   if identification of the second station is not determined, steering the directional antenna through a series of candidate directions to determine an optimum direction for receipt of communications from the second station.

2. A method as in claim 1 wherein the directional antenna is a steerable array of multiple antenna elements.

3. A method as in claim 1 wherein a first portion of the transmission is a preamble of a data frame.

4. A method as in claim 3 wherein the preamble portion of the data frame is encoded with a more robust modulation scheme than the following portions of the transmission.

5. A method as in claim 3 wherein the preamble portion may have one of a plurality of possible preamble formats.

6. A method as in claim 3 wherein the preamble portion contains sender identification and the payload is regarded as subsequently sent frames.

7. A method as in claim 3 wherein the preamble portion is a complete data frame containing identification of a sender.

8. A method as in claim 1 wherein antenna array parameters are associated with the identification of the second station.

9. A method as in claim 8 wherein the unit identification and antenna parameters are stored in a table associated with a network layer address associated with forwarding communications between the first and second station.

10. A method as in claim 9 wherein the network address is an Internet Protocol address and the first station performs routing functions for network layer messaging.

11. A method as in claim 8 additionally comprising the step of:
   if it is not possible to determine an identification of antenna parameters from the identification of the second station,
   searching for an antenna parameter setting to determine an optimum direction for receipt of communications from the second station.

12. A method as in claim 1 wherein a robust, lower coded modulation type is used during transmission of a first portion, and a higher coded modulation type is used during a later portion of the transmission from the second station.

13. A method as in claim 1 wherein the first station is an access point and the second station is a remote station.

14. A method as in claim 1 wherein the first station is a remote station and the second station is an access point.

15. A method as in claim 1 wherein a first portion of the transmission is a first packet.

16. A method as in claim 15 additionally comprising the step of:
   during a sequence of known series of transferred packets, steering the antenna array without concern for packet loss.

17. A method as in claim 16 additionally comprising the step of:
   employing a packet acknowledgement mechanism to recover any lost data.

18. A method as in claim 16 additionally comprising the step of:
   relying on a radio link control protocol (RLP) mechanism to recover lost packets.

19. A method as in claim 1 wherein a subsequent transmission is a later portion of a data frame.

20. A method as in claim 1 wherein a subsequent transmission is a later transmitted packet.

21. A method as in claim 1 wherein the step of determining identification of the transmitting second station occurs from a portion of the transmission received while the antenna is operating in the omni-directional mode.

22. A method as in claim 21 wherein identification is contained in a higher coded portion of the transmission.

23. A method as in claim 1 wherein the directional antenna is steered to the last known direction before later portions of the transmission begin.

24. A method as in claim 1 additionally comprising the step of:
   after the optimum direction is determined, storing the direction information, together with the unit identification information, for use in subsequent processing of signals received from the identified unit.

25. A method of operating a communication system in which a first and second station exchange information using wireless physical layer signaling, and the first station making use of a directional antenna, the method comprising the steps of:
   determining when a wireless signal is being received from the second station at the first station;
   utilizing messages at a protocol layer higher than the physical layer to control transmission and retransmission of data from a specific second station;

using the transmitted messages at higher layer protocols to steer the antenna array; and wherein the protocol attributes are used to force a retransmission of the data packet for the purpose of optimizing the antenna array steering.

26. A method as in claim 25 wherein the protocol attribute is an acknowledgement (ACK) returned from the first station to the second station.

27. A method as in claim 26 wherein the acknowledgement message is suppressed in order to force a retransmission from the second station to the first station.

28. A method as in claim 27 wherein the acknowledgment suppression is performed only upon one of a number, N, of transmissions to provide for reduction in duty cycle of the adaptation of the antenna.

29. A method as in claim 26 additionally comprising the step of:

after the first acknowledgement suppression, identifying the second station from which the transmission is being received to determine an angle for the antenna based upon the history of past transmissions from the specific second station.

30. A method as in claim 25 wherein the protocol units utilize Request to Send (RTS) and Clear to Send (CTS) protocol data units to ensure transmission of frames from a specific second station.

31. A method as in claim 25 wherein the protocol units are Point Coordination Function (PCF) entities that only request a specific second station to transmit.

* * * * *

UNITED STATES PATENT AND TRADEMARK OFFICE
CERTIFICATE OF CORRECTION

PATENT NO. : 7,224,685 B2  
APPLICATION NO. : 09/952198  
DATED : May 29, 2007  
INVENTOR(S) : James A. Proctor, Jr.

It is certified that error appears in the above-identified patent and that said Letters Patent is hereby corrected as shown below:

Item (57) ABSTERACT, line 12, after the word "scanned", insert --to--.

Item (57) ABSTRACT, line 15, after the word "signal", insert --is determined--.

Item (57) ABSTRACT, line 18, after the word "reception", delete "for" and insert therefor --of--.

At column 2, line 8, after the words "phase with", delete "one the other due" and insert therefor --the other due to--.

At column 2, line 34, after the word "various", delete "angle" and insert therefor --angles--.

At column 3, line 14, after the word "signal,", delete "for use" and insert --is used--.

At column 3, line 53, before the word "analogous" delete "an".

At column 6, line 17, before the word "subsequent", delete "a" and insert therefor --for--.

At column 7, line 48, after the words "to know", insert --when the--.

At column 7, line 50, after the word "in turn", delete "no time in which to or there".

At column 8, line 41, after the word "while", insert --in--.

At column 8, line 42, after the word "mode" delete "can".

Signed and Sealed this

Sixth Day of November, 2007

JON W. DUDAS  
*Director of the United States Patent and Trademark Office*